US009210166B2

(12) United States Patent
Sama

(10) Patent No.: US 9,210,166 B2
(45) Date of Patent: *Dec. 8, 2015

(54) APPLYING A PARTIAL PASSWORD IN A MULTI-FACTOR AUTHENTICATION SCHEME

(71) Applicant: CA, Inc., Islandia, NY (US)

(72) Inventor: VenkataBabji Sama, Bangalore (IN)

(73) Assignee: CA, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/105,270

(22) Filed: Dec. 13, 2013

(65) Prior Publication Data

US 2014/0101738 A1    Apr. 10, 2014

Related U.S. Application Data

(63) Continuation of application No. 13/010,826, filed on Jan. 21, 2011, now Pat. No. 8,667,280.

(60) Provisional application No. 61/307,477, filed on Feb. 24, 2010.

(51) Int. Cl.
*H04L 9/32* (2006.01)
*H04L 29/06* (2006.01)
*G06F 21/31* (2013.01)

(52) U.S. Cl.
CPC .............. *H04L 63/083* (2013.01); *G06F 21/31* (2013.01); *H04L 9/3226* (2013.01); *H04L 9/3271* (2013.01); *G06F 2221/2103* (2013.01)

(58) Field of Classification Search
CPC ... H04L 63/083; H04L 9/3271; H04L 9/3226; G06F 21/31; G06F 2221/2103
See application file for complete search history.

(56) References Cited

U.S. PATENT DOCUMENTS

| | | | |
|---|---|---|---|
| 8,006,300 B2* | 8/2011 | Mizrah | 726/20 |
| 2003/0037103 A1* | 2/2003 | Salmi et al. | 709/203 |
| 2008/0082817 A1* | 4/2008 | Takahashi et al. | 713/155 |
| 2008/0189768 A1* | 8/2008 | Callahan et al. | 726/4 |

\* cited by examiner

*Primary Examiner* — Nirav B Patel
*Assistant Examiner* — Mohammed Waliullah
(74) *Attorney, Agent, or Firm* — Vierra Magen Marcus LLP

(57) ABSTRACT

A method includes transmitting a User ID and a full Password of a user of a client device to a server via the client device, and then establishing a network connection between the client device and the server after the User ID and the full Password. The method also includes receiving, from the server via the client device, an encrypted secret PIN (ESPIN) and a challenge for corresponding positions of a Partial Password, entering the Partial Password via the client device, and computing a secret PIN (SPIN) from the ESPIN via the client device in response to a correct entry of the Partial Password. The Additional Factor is unlocked using the SPIN, and the unlocked Additional Factor is transmitted to the server to request authentication of the user of the client device. The client device includes a processor and memory having instructions for the above method.

11 Claims, 1 Drawing Sheet

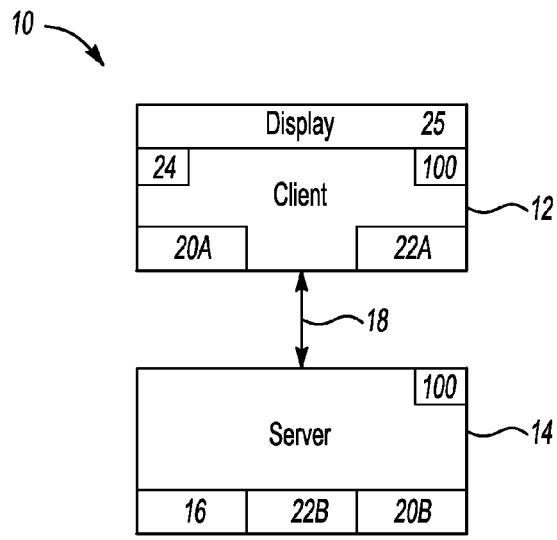
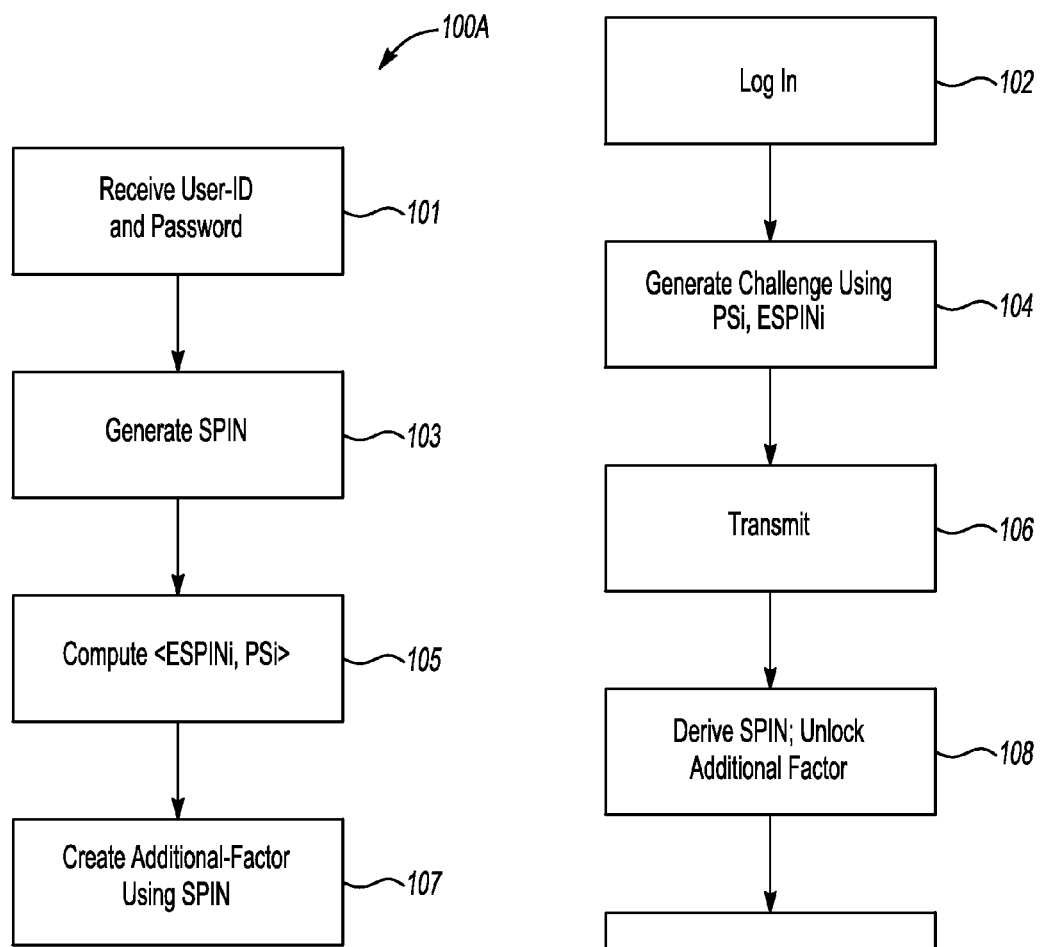

APPLYING A PARTIAL PASSWORD IN A MULTI-FACTOR AUTHENTICATION SCHEME

CROSS-REFERENCE TO RELATED APPLICATIONS

This application is a continuation of U.S. patent application Ser. No. 13/010,826 filed on Jan. 21, 2011, published as US 2011/0208964 on Aug. 25, 2011 and issued as U.S. Pat. No. 8,667,280 on Mar. 4, 2014, which claims the benefit of and priority to U.S. Provisional Patent Application No. 61/307,477 filed on Feb. 24, 2010.

TECHNICAL FIELD

The invention relates to applying a partial password in a multi-factor user identity authentication scheme.

BACKGROUND

A Partial Password authentication technique may be employed to protect a user password from key loggers and/or from direct observation, e.g., "shoulder surfing". In the Partial Password authentication technique, a server may challenge a user of a client device networked with the server with a predetermined set of password character positions. The user responds by entering the corresponding individual characters of a unique user password appearing at the challenged positions. For example, when a user is challenged to identify the characters appearing at positions 1, 3, and 5 of a password "PaSsWorD", the user enters "PSW". The server then verifies the entry against an expected partial password to determine if the response is correct.

Online theft attempts have increased with the ever-expanding use of the internet for conducting business transactions. As a result, password-based authentication security measures alone may provide relatively weak protection. Hardware-based or software-based multi-factor authentication schemes such as a One Time Passcode or Password (OTP) and Public Key Infrastructure (PKI) are becoming increasingly popular. Due to the practical limitations of hardware-based solutions, software-based solutions may be preferred in mass deployment situations.

Such authentication schemes might use the full Password, i.e., a "Known Factor", to lock an Additional Factor such as an OTP-Shared Secret or a Private Key maintained on a disk or other tangible storage media. A client unlocks the Additional Factor and ultimately derives the proof of identity, for example generates the OTP, signs the challenge, etc., thereby completing the required authentication. That is, multi-factor schemes usually require the full Password to be available on the client-side of a given transaction during the authentication process. However, the user still must enter the full Password via the client device, a process which remains vulnerable to the key logging and shoulder surfing techniques noted above.

SUMMARY

A method is disclosed herein that includes recording a User ID and full Password on a server via a client device. Thereafter, the method includes establishing a network connection between the client device and the server after recording the User ID and the full Password, and then receiving, from the server via the client device, a randomly selected encrypted secret PIN (ESPIN) and a challenge for corresponding positions of a Partial Password. The method further includes collecting the Partial Password via the client device, using the Partial Password to compute a secret PIN (SPIN) from the ESPIN, and unlocking, via the client device, an Additional Factor using the SPIN. The unlocked Additional Factor is transmitted to the server to thereby authenticate a user of the client device.

A client device useable in the above method includes a processor and memory. The memory includes stored or recorded instructions for unlocking an Additional Factor in a transaction with a server. In this transaction, the server randomly generate a secret PIN (SPIN) in response to a User ID, computes all possible Partial Passwords from a full Password of a user of the client device, and separately encrypts the SPIN with each of the possible Partial Passwords to thereby compute a set of encrypted SPINs (ESPINs). The Additional Factor, e.g., a private key or shared secret/one-time password (OTP), is then encrypted using only the SPIN.

The processor of the client device is configured to execute the instructions from the memory and thereby cause the processor to transmit the User ID to the server over an established network connection, and receive a challenge from the server of one of the ESPINs and the corresponding positions of the Partial Password encrypted in the ESPIN. The processor then computes the SPIN from the ESPIN in response to a correct entry of the corresponding positions of the Partial Password, unlocks the Additional Factor using the SPIN, and may transmit the unlocked Additional Factor to the server to thereby authenticate the user.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 1 is a schematic illustration of a server-based system for authenticating a client/user in a multi-factor authentication scheme;

FIG. 2 is a graphical flow chart describing a method for issuing credentials for the system shown in FIG. 1; and FIG. 3 is a graphical flow chart describing a method for authenticating a user using the system shown in FIG. 1.

DETAILED DESCRIPTION

Referring to the drawings, an authentication system 10 is shown in FIG. 1 that is configured for use in a multi-factor authentication scheme. The system 10 includes a host machine or server 14 in networked communication with a client device 12. The server 14 hosts a secure website 16 or other secure application. The client device 12 and the server 14 communicate with each other over a network connection 18 such as the internet, a wide area network (WAN), or a local area network (LAN).

The client device 12 and the server 14 each have respective memory 20A, 20B and a respective central processing unit (CPU) 22A, 22B. The server 14 includes process instructions or code suitable for executing the present method 100, which is explained below in two parts as method 100A (FIG. 2) and method 100B (FIG. 3). The method 100 authenticates a user of the client device 12 without requiring entry of a full password other than at issuance, as noted below.

The memory 20A, 20B is tangible/non-transitory. For instance, the memory 20A, 20B may be any computer-readable medium that participates in providing computer-readable data or process instructions. Such a medium may take many forms, including, but not limited to, non-volatile media and volatile media. Non-volatile media may include, for example, optical or magnetic disks and other persistent memory. Volatile media may include, for example, dynamic random access memory (DRAM), which may constitute a main memory. Such instructions may be transmitted by one or more transmission media, including coaxial cables, copper wire and fiber optics, including the wires that comprise a system bus coupled to a processor of a computer. Memory 20A, 20B may also include a floppy disk, a flexible disk, hard disk, magnetic tape, any other magnetic medium, a CD-ROM, DVD, any other optical medium, etc.

Still referring to FIG. 1, the client device 12 and the server 14 can be configured or equipped with other required computer hardware, such as a high-speed clock, requisite Analog-to-Digital (A/D) and/or Digital-to-Analog (D/A) circuitry, any necessary input/output circuitry and devices (I/O), as well as appropriate signal conditioning and/or buffer circuitry. Any algorithms resident in the client device 12 and the server 14 or accessible thereby may be stored via memory 20A, 20B and automatically executed by the CPUs 22A and/or 22B to provide the respective functionality.

Communication is established between the client device 12 and the server 14 over the network connection 18 when a user attempts to login to the website 16, e.g., by entering a predetermined Uniform Resource Locator (URL) into a web browser 24. Access to the website 16 is not limited to the web browser 24, or even necessarily initiated by the client device 12. For example, a Windows Login scenario may be present, and/or the server 14 may request authentication from the client device 12 in the middle of an existing web session.

Upon occurrence of this event, an authentication dialogue takes place, possibly including displaying information to a user via a display 25. The authentication scheme is designed such that both parties, i.e., the client device 12 and the server 14, are required to coordinate to complete the authentication process.

Issuance

Referring to FIG. 2, the process of initial issuance of the SPIN and an ESPIN is described in further detail as method portion 100A. At step 101, the server 14 of FIG. 1 may receive a User ID and a full Password from the user of the client device 12. This information may be temporarily recorded in memory 20B of the server 14.

At step 103, the server 14 automatically generates the SPIN. Once the SPIN has been generated, the method portion 100A proceeds to step 105.

At step 105, the server 14 of FIG. 1 computes, for each partial position set ($PS_i$) in a user's full password, the values for sets ($PPWD_i$) and ($ESPIN_i$), wherein ($PPWD_i$)=a Partial-Password (Password, $PS_i$), ($ESPIN_i$)=Encrypted (SPIN, $PPWD_i$), and (i)=the number of variations in a number of challenged password positions (r). This step therefore may entail encrypting the SPIN generated at step 103. These values may be stored in memory 20B of the server 14, or at a suitable location that is readily accessible by the server 14.

At step 107, the server 14 creates or accesses an Additional Factor, and then locks the Additional Factor using the SPIN. The locked Additional Factor is then transmitted via the network connection 18 to the client device 12.

The number of ESPINs for a given user password is combinatorial, i.e., $\Sigma_i({}^nC_r)$, with respect to the size (n) of the user's password, the number of positions (r) to be selected, and the number of variations (i) in the number of positions to be challenged. The server 14 can optionally pre-compute all of the ESPINs in one embodiment, in which case the password and SPIN need not be stored on the server 14. Alternatively, the server 14 can chose to store the Password and the SPIN in a protected manner. In such a case, the server 14 can compute the ESPIN during the authentication process.

Authentication

Referring to FIG. 3, and with reference to the various system elements shown in FIG. 1 and described above, the authentication method portion 100B begins at step 102, wherein a user of the client device 12 begins to log in to the server 14. For example, step 102 may entail the user entering a User-ID using the web browser 24. The method portion 100B then proceeds to step 104.

At step 104, the server 14 randomly selects the $ESPIN_i$. This $ESPIN_i$ may be protected by the Partial Password corresponding to the Position Set ($PS_i$), with the value of the Position Set ($PS_i$) referring only to the challenged positions. The server 14 selects a Partial Password Challenge, ($PPC_i$) =<$ESPIN_i$, $PS_i$> as described above for the user, such that the value of (i) is repeated if the earlier authentication attempt was unsuccessful. Otherwise, the server 14 may chose (i) randomly. The server 14 may optionally respond with a conventional challenge along with the Partial Password Challenge ($PPC_i$) if the authentication scheme so requires.

After step 104, the server 14 proceeds to step 106 and transmits the challenge as described above to the client device 12, and then proceeds to step 108.

At step 108, the client device 12 collects the Partial Password ($PPWD_i$) from the user, uses the Partial Password in conjunction with the challenge to compute or derive the SPIN, and unlocks the Additional Factor. That is, the client device 12 receives the Partial Password ($PPWD_i$) from the user using the positions as specific in the Position Set ($PS_i$), and computes the SPIN as: SPIN=Decrypt ($ESPIN_i$, $PPWD_i$). Once the Additional Factor is unlocked, the server 14 can derive the proof of identity needed to authenticate the identity of the user, e.g., by generating the OTP, signing the challenge, etc. The method portion 100B then proceeds to step 110.

At step 110, the server 14 of FIG. 1 verifies the proof of identity to authenticate the user of the client device 12. Upon successful authentication, the user is free to access the website 16 or any other protected application. The method portion 100B is finished.

The selection of the Partial Password Challenge ($PPC_i$) avoids exposing all existing password positions. The server 14 instead can remember the last challenged positions, and then decide whether or not to repeat the set based on the last authentication status. The Partial Password challenge ($PPC_i$) may be repeated as long as the last authentication attempt is either unsuccessful or incomplete. Otherwise, one may end up exposing all possible position combinations, and hence knowing a partial set is sufficient to succeed the authentication by repeating the challenge request until the known Partial Password is challenged. A random challenge among the available challenges may be selected if the last authentication is successful. This strategy may help to increase the probability of an end user being aware of the full password. The User ID is required as part of the challenge request for look up of the user record.

Further Optimization of the Authentication Scheme

The authentication scheme as set forth above in FIGS. 2 and 3 can further be hardened or optimized by enhancing the challenge-response protocol. In the scheme as described above, the number of Encrypted SPINs (ESPINs) is limited, and there is no fool proof evidence that the user used the Partial Password ($PPWD_i$) in response to the challenge: $PPC_i$=<$ESPIN_i$, $PS_i$>. The strength of the criteria of selecting the Partial Password Challenge ($PPC_i$) as explained above increases with the number of ESPINs. Therefore, the number of ESPINs may be increased.

This may be achieved by introducing an additional random secret ($AS_r$) in the Partial Password Challenge ($PPC_i$), which can be derived by the client device 12 only by using the corresponding Partial Password ($PPWD_i$). The server 14 would expect the random secret ($AS_r$) in the response from the client device 12, which ensures that the client device 12 uses the appropriate Partial-Password ($PPWD_i$) during the transaction.

For this purpose one may modify the ESPIN computation described above to embed a random secret ($AS_r$) in it. For every Position Set ($PS_i$), the server 14 may compute a multiple (r=0 ... k) of ESPINs, hereinafter referred to as $ESPIN_{i,r}$, by combining the random secret ($AS_r$) with the SPIN as:

$$ESPIN_{i,r} = Encrypt(SPIN + AS_r, PPWD_i)$$

Accordingly, the challenge is: $PPC_i = \langle ESPIN_{i,r}, PS_i \rangle$. Now the client device 12 is unaware of the number of positions to be selected, i.e., (r), as there are multiple $ESPIN_{i,r}$ for every Position Set ($PS_i$), though the Position Set ($PS_i$) is unencrypted. As the server 14 expects the random secret ($AS_r$) in the authentication request along with normal challenge-response, the client device 12 is forced to use the appropriate Partial Password ($PPWD_i$) in the transaction to extract the random secret ($AS_r$).

While the best modes for carrying out the invention have been described in detail, those familiar with the art to which this invention relates will recognize various alternative designs and embodiments for practicing the invention within the scope of the appended claims.

The invention claimed is:

1. A method comprising:
    transmitting a User ID and a full Password of a user of a client device to a server via the client device;
    establishing a network connection between the client device and the server after transmitting the User ID and the full Password;
    receiving, from the server via the client device, an encrypted secret PIN (ESPIN) and a challenge for corresponding positions of a Partial Password;
    receiving the Partial Password via the client device;
    computing a secret PIN (SPIN) from the ESPIN via the client device in response to a correct entry of the Partial Password into the client device;
    unlocking, via the client device, an Additional Factor using the SPIN; and
    transmitting the unlocked Additional Factor to the server to request an authentication by the server of the user of the client device.

2. The method of claim 1, wherein the Additional Factor is a private key.

3. The method of claim 1, wherein the Additional Factor is a shared secret.

4. The method of claim 1, wherein the client device includes a web browser, and wherein establishing a network connection comprises receiving a URL address for the server via the web browser of the client device.

5. A client device comprising:
    a processor; and
    memory on which is recorded instructions for unlocking an Additional Factor in a transaction with a server, wherein the server used in the transaction is configured to randomly generate a secret PIN (SPIN) in response to a User ID, to compute all possible Partial Passwords from a full Password of a user of the client device, and to separately encrypt the SPIN with each of the possible Partial Passwords to thereby compute a set of encrypted SPINS (ESPINs), and lock an Additional Factor using only the SPIN;
    wherein the processor of the client device is configured to execute the instructions from the memory and thereby cause the processor to:
        establish a network connection between the client device and the server;
        transmit the User ID to the server over the established network connection;
        receive a challenge from the server of one of the ESPINs and the corresponding positions of the Partial Password encrypted in the ESPIN;
        compute the SPIN from the ESPIN in response to a correct entry of the corresponding positions of the Partial Password;
        unlock the Additional Factor using the computed SPIN; and
        transmit the unlocked Additional Factor to the server to authenticate the user of the client device.

6. The client device of claim 5, wherein the Additional Factor is a private key.

7. The client device of claim 5, wherein the Additional Factor is a shared secret.

8. The client device of claim 5, wherein the client device is configured with a web browser, and wherein the processor is operable to establish the network connection via receiving of a URL address in the web browser.

9. A device comprising:
    a processor; and
    memory on which is recorded instructions for unlocking an Additional Factor in a transaction with a server,
    wherein the processor is configured to execute the instructions from the memory to cause the processor to:
        transmit a User ID and a full Password of a user of the device to the server;
        establish a network connection between the device and the server after transmitting the User ID and the full Password;
        receive, from the server via the device, an encrypted secret PIN (ESPIN) and a challenge for corresponding positions of a Partial Password;
        receive the Partial Password via the device;
        compute a secret PIN (SPIN) from the ESPIN via the device in response to a correct entry of the Partial Password into the device;
        unlock, via the device, an Additional Factor using the SPIN; and
        transmit the unlocked Additional Factor to the server to request an authentication by the server of the user of the device.

10. The device of claim 9, wherein the Additional Factor is a private key.

11. The device of claim 9, wherein the Additional Factor is a shared secret.

* * * * *